United States Patent
Sanami et al.

(10) Patent No.: US 9,658,075 B2
(45) Date of Patent: May 23, 2017

(54) TRAVEL ASSIST SYSTEM, TRAVEL ASSIST METHOD, AND COMPUTER PROGRAM

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Kenta Sanami, Anjo (JP); Takayuki Miyajima, Anjo (JP); Satoshi Hirano, Anjo (JP); Akira Matsuda, Anjo (JP); Tomoki Kodan, Toyota (JP); Kuniaki Tanaka, Toyota (JP)

(73) Assignees: AISIN AW CO., LTD., Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/774,402

(22) PCT Filed: Mar. 3, 2014

(86) PCT No.: PCT/JP2014/055242
§ 371 (c)(1),
(2) Date: Sep. 10, 2015

(87) PCT Pub. No.: WO2014/156483
PCT Pub. Date: Oct. 2, 2014

(65) Prior Publication Data
US 2016/0033294 A1    Feb. 4, 2016

(30) Foreign Application Priority Data

Mar. 29, 2013    (JP) ................................ 2013-074882

(51) Int. Cl.
*G01C 21/34*    (2006.01)
*B60K 6/445*    (2007.10)
(Continued)

(52) U.S. Cl.
CPC .......... *G01C 21/3415* (2013.01); *B60K 6/445* (2013.01); *B60L 7/14* (2013.01);
(Continued)

(58) Field of Classification Search
CPC combination set(s) only.
See application file for complete search history.

(56) References Cited

U.S. PATENT DOCUMENTS 8,116,973 B2 *   2/2012   Soma .................... B60K 6/445
                                                340/995.1
8,412,445 B2 *   4/2013   Uyeki ............. G08G 1/096827
                                                701/117
(Continued)

FOREIGN PATENT DOCUMENTS

CN    101517361 A    8/2009
EP    2689982 A1     1/2014
(Continued)

OTHER PUBLICATIONS

Communication dated Mar. 21, 2016 from the European Patent Office in counterpart application No. 14775380.0.

*Primary Examiner* — Thomas Tarcza
*Assistant Examiner* — Edward J Pipala
(74) *Attorney, Agent, or Firm* — Sughrue Mion, PLLC

(57) ABSTRACT

A travel assist system, a travel assist method, and a computer program that prevent frequent corrections of a travel plan due to variations in congestion information are provided. Congestion information is acquired from a VICS center. The current state of a vehicle is acquired. It is determined whether or not the congestion status of an expected travel route for the vehicle has been varied from the congestion information using a criterion based on the state of the vehicle. In the case where it is determined that the congestion status of the expected travel route has been varied, the
(Continued)

travel plan 48 is corrected using the congestion status after the variation.

7 Claims, 11 Drawing Sheets

(51) Int. Cl.
| | |
|---|---|
| *B60L 11/14* | (2006.01) |
| *B60L 15/20* | (2006.01) |
| *B60W 20/00* | (2016.01) |
| *G08G 1/0968* | (2006.01) |
| *B60W 20/12* | (2016.01) |
| *G08G 1/0962* | (2006.01) |
| *B60L 7/14* | (2006.01) |
| *B60L 11/00* | (2006.01) |
| *B60L 11/12* | (2006.01) |
| *B60L 11/18* | (2006.01) |

(52) U.S. Cl.
CPC ........... *B60L 11/005* (2013.01); *B60L 11/123* (2013.01); *B60L 11/14* (2013.01); *B60L 11/1861* (2013.01); *B60L 15/20* (2013.01); *B60L 15/2009* (2013.01); *B60L 15/2045* (2013.01); *B60W 20/00* (2013.01); *B60W 20/104* (2013.01); *B60W 20/12* (2016.01); *G01C 21/34* (2013.01); *G01C 21/3492* (2013.01); *G08G 1/0962* (2013.01); *G08G 1/0968* (2013.01); *G08G 1/096827* (2013.01); *G08G 1/096844* (2013.01); *G08G 1/096872* (2013.01); *B60L 2240/12* (2013.01); *B60L 2240/22* (2013.01); *B60L 2240/421* (2013.01); *B60L 2240/423* (2013.01); *B60L 2240/441* (2013.01); *B60L 2240/443* (2013.01); *B60L 2240/622* (2013.01); *B60L 2240/68* (2013.01); *B60L 2250/16* (2013.01); *B60L 2260/42* (2013.01); *B60L 2260/52* (2013.01); *B60L 2260/54* (2013.01); *B60W 2550/20* (2013.01); *B60W 2550/40* (2013.01); *Y02T 10/6217* (2013.01); *Y02T 10/6239* (2013.01); *Y02T 10/645* (2013.01); *Y02T 10/705* (2013.01); *Y02T 10/7005* (2013.01); *Y02T 10/7022* (2013.01); *Y02T 10/7044* (2013.01); *Y02T 10/7077* (2013.01); *Y02T 10/72* (2013.01); *Y02T 10/7258* (2013.01); *Y02T 10/7283* (2013.01); *Y02T 10/7291* (2013.01); *Y02T 90/16* (2013.01); *Y02T 90/161* (2013.01); *Y02T 90/162* (2013.01); *Y10S 903/902* (2013.01)

(56) References Cited

U.S. PATENT DOCUMENTS

| | | | |
|---|---|---|---|
| 2002/0045985 A1* | 4/2002 | Kerner | G08G 1/0104 701/117 |
| 2007/0021909 A1* | 1/2007 | Matsuda | G01C 21/3469 701/532 |
| 2007/0208467 A1 | 9/2007 | Maguire et al. | |
| 2008/0094250 A1* | 4/2008 | Myr | G08G 1/04 340/909 |
| 2008/0275639 A1* | 11/2008 | Yun | G01C 21/3492 701/533 |
| 2010/0010697 A1 | 1/2010 | Soma et al. | |
| 2010/0131139 A1 | 5/2010 | Sakai et al. | |

FOREIGN PATENT DOCUMENTS

| | | |
|---|---|---|
| JP | 8-338736 A | 12/1996 |
| JP | 2010-252409 A | 11/2010 |
| JP | 2011-20571 A | 2/2011 |
| JP | 2011-027472 A | 2/2011 |

* cited by examiner

FIG. 3
CONGESTION INFORMATION
(DISTRIBUTED AT 14:01 ON JAN. 6, 2013)
| VICS LINK NUMBER | CONGESTION DEGREE | SECTION | TRAVEL TIME |
|---|---|---|---|
| 533945-4-4 | CONGESTED | all | 7 MINUTES |
| 533946-10-2 | CROWDED | all | 5 MINUTES |
| 533947-6-1 | CROWDED | A:200m | 3 MINUTES |
| ... | ... | ... | ... |
FIG. 4
LONG OPERATION MODE
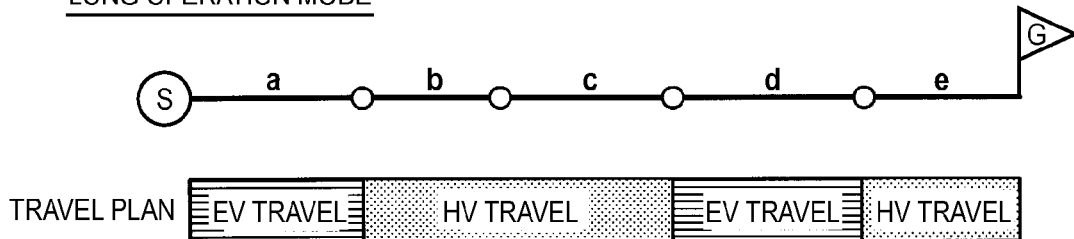
FIG. 5
MIDDLE OPERATION MODE
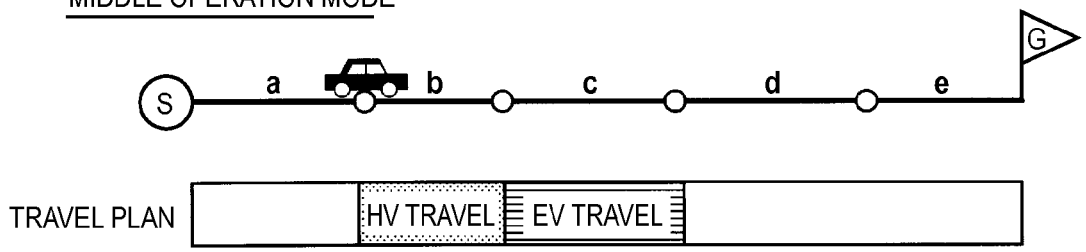

| LOAD STATUS OF COMMUNICATION | RESOURCE OF COMMUNICATION CONTROL ECU | OPERATION MODE | CONGESTION DETERMINATION CRITERION |
|---|---|---|---|
| LOW | RICH | MIDDLE OR LONG | (1) |
| | POOR | MIDDLE | (2) |
| | | LONG | (3) |
| HIGH | RICH OR POOR | MIDDLE | (4) |
| | | LONG | (5) |

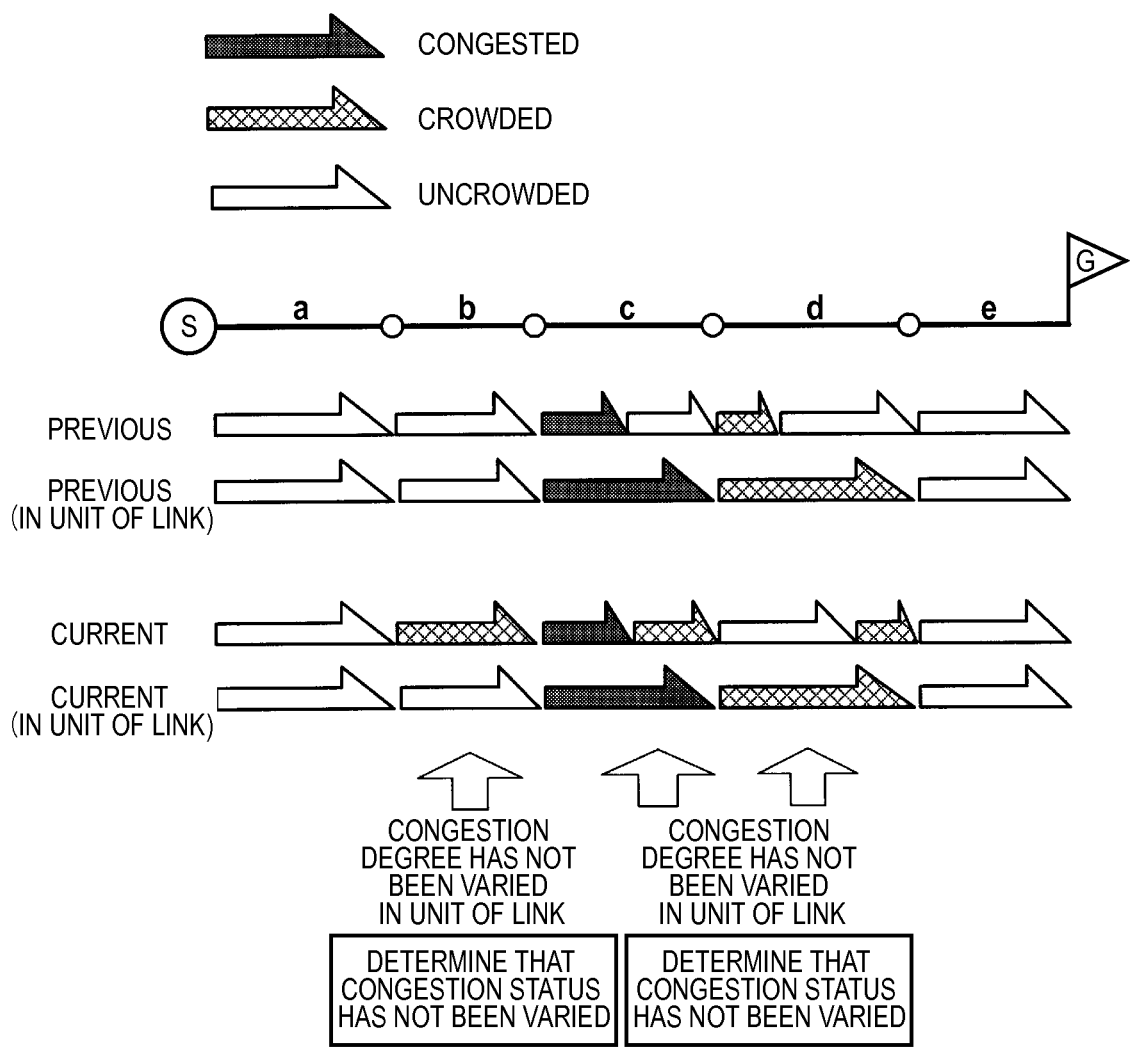

TRAVEL ASSIST SYSTEM, TRAVEL ASSIST METHOD, AND COMPUTER PROGRAM

This application is a National Stage of International Application No. PCT/JP2014/055242 filed Mar. 3, 2014, claiming priority based on Japanese Patent Application No. 2013-074882, filed Mar. 29, 2013, the contents of all of which are incorporated herein by reference in their entirety.

TECHNICAL FIELD

The present subject matter relates to a travel assist system, a travel assist method, and a computer program for preparing a travel plan that allows a vehicle to travel efficiently.

BACKGROUND ART

In recent years, there have been provided electric vehicles in which a motor driven on the basis of electric power supplied from a battery is used as a drive source, hybrid vehicles in which a motor and an engine are used as drive sources, and so forth besides gasoline vehicles in which an engine is used as a drive source.

In the hybrid vehicle according to the related art, a travel plan, which is a control schedule for the motor and the engine for an expected travel route, is prepared when the vehicle starts to travel in order to allow the vehicle to travel with a high fuel efficiency. In preparing the travel plan, the fuel consumption amount during travel is estimated, and the travel plan is prepared using the estimated fuel consumption amount. For example, Japanese Patent Application Publication No. 2011-27472 (JP 2011-27472 A) describes a technology for calculating a fuel consumption amount required to travel along links on the basis of the link length of the links, the average vehicle speed, and congestion information, exploring for a route that minimizes the fuel consumption amount, and preparing a travel plan that minimizes the fuel consumption amount when the vehicle travels along the route found in the exploration.

RELATED-ART DOCUMENTS

Patent Documents

[Patent Document 1] Japanese Patent Application Publication No. 2011-27472 (JP 2011-27472 A) (pages 4 to 6 and FIG. 11)

SUMMARY OF THE INVENTION

In the technology described in Patent Document 1, the travel plan is prepared on the basis of the congestion information, and thus it is necessary to correct (reprepare) the travel plan each time the congestion information is varied. If the travel plan is corrected each time the congestion information is varied, however, the travel plan is corrected frequently, which increases the process burden related to the correction of the travel plan and the process burden related to communication for transmission of the corrected travel plan within the vehicle. In addition, some of the variations in congestion information hardly affect the travel plan, and inevitably correcting the travel plan even for such variations unnecessarily increases the process burden.

The present subject matter has been made to address the foregoing issue of the related art, and therefore has an object to provide a travel assist system, a travel assist method, and a computer program that prevent frequent corrections of a travel plan, which is a control schedule for a drive source of a vehicle, due to variations in congestion information.

Means for Solving the Problem

In order to achieve the foregoing object, the present subject matter provides a travel assist system that prepares a travel plan related to control of a drive source of a vehicle and that assists a vehicle in traveling on the basis of the prepared travel plan, a travel assist method for assisting the vehicle in traveling using the system, and a computer program that causes the system to implement the following components. Specifically, the travel assist system includes: travel planning module (33) for preparing, in the case where a vehicle (2) travels along a predetermined travel route, a travel plan related to control of a drive source (4, 5) of the vehicle for the travel route; congestion information acquisition module (33) for acquiring congestion information on the travel route; vehicle state acquisition module (33) for acquiring a state of the vehicle; variation determination module (33) for determining whether or not a congestion status of the travel route has been varied from the congestion information using a criterion based on the state of the vehicle; and travel plan correction module (33) for correcting the travel plan, in the case where it is determined that the congestion status of the travel route has been varied, using the congestion status after the variation.

With the travel assist system, the travel assist method, and the computer program according to the present subject matter is configured as described above, it is possible to prevent frequent corrections of a travel plan, which is a control schedule for a drive source of a vehicle, due to variations in congestion information. As a result, it is possible to reduce the process burden related to the correction of the travel plan and the process burden related to communication for transmission of the corrected travel plan within the vehicle. In addition, it is possible to correct the travel plan only in a situation in which it is necessary to correct the travel plan on the basis of the status of the vehicle, and to prevent an unnecessary process from being performed.

BRIEF DESCRIPTION OF THE DRAWINGS

FIG. 3 illustrates an example of congestion information stored in a congestion information DB.

FIG. 4 illustrates an example of a travel plan prepared in the case where the vehicle is set to a long operation mode.

FIG. 5 illustrates an example of a travel plan prepared in the case where the vehicle is set to a middle operation mode.

FIG. 16 illustrates a specific example in which it is determined in the third determination process whether or not the congestion status of the expected travel route has been varied.

A travel assist system, embodied as a navigation apparatus, according to an embodiment will be described in detail below with reference to the drawings.

Figure 1:
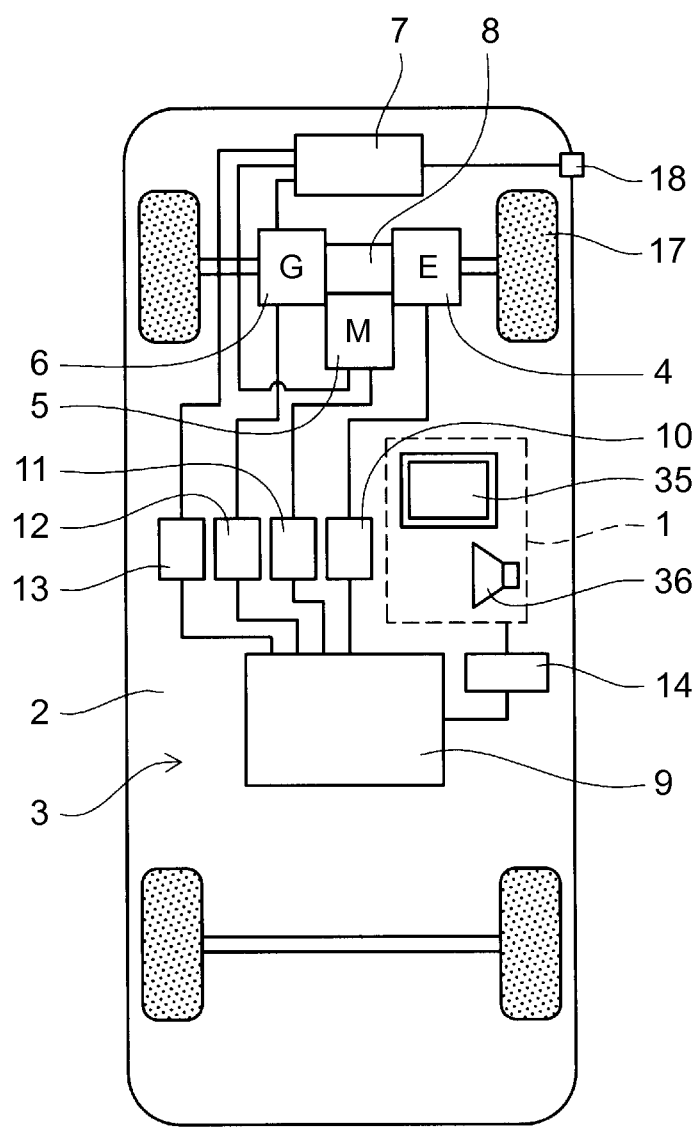
FIG. 1 illustrates a schematic configuration of a vehicle and a vehicle control system according to an embodiment.
Figure 2:
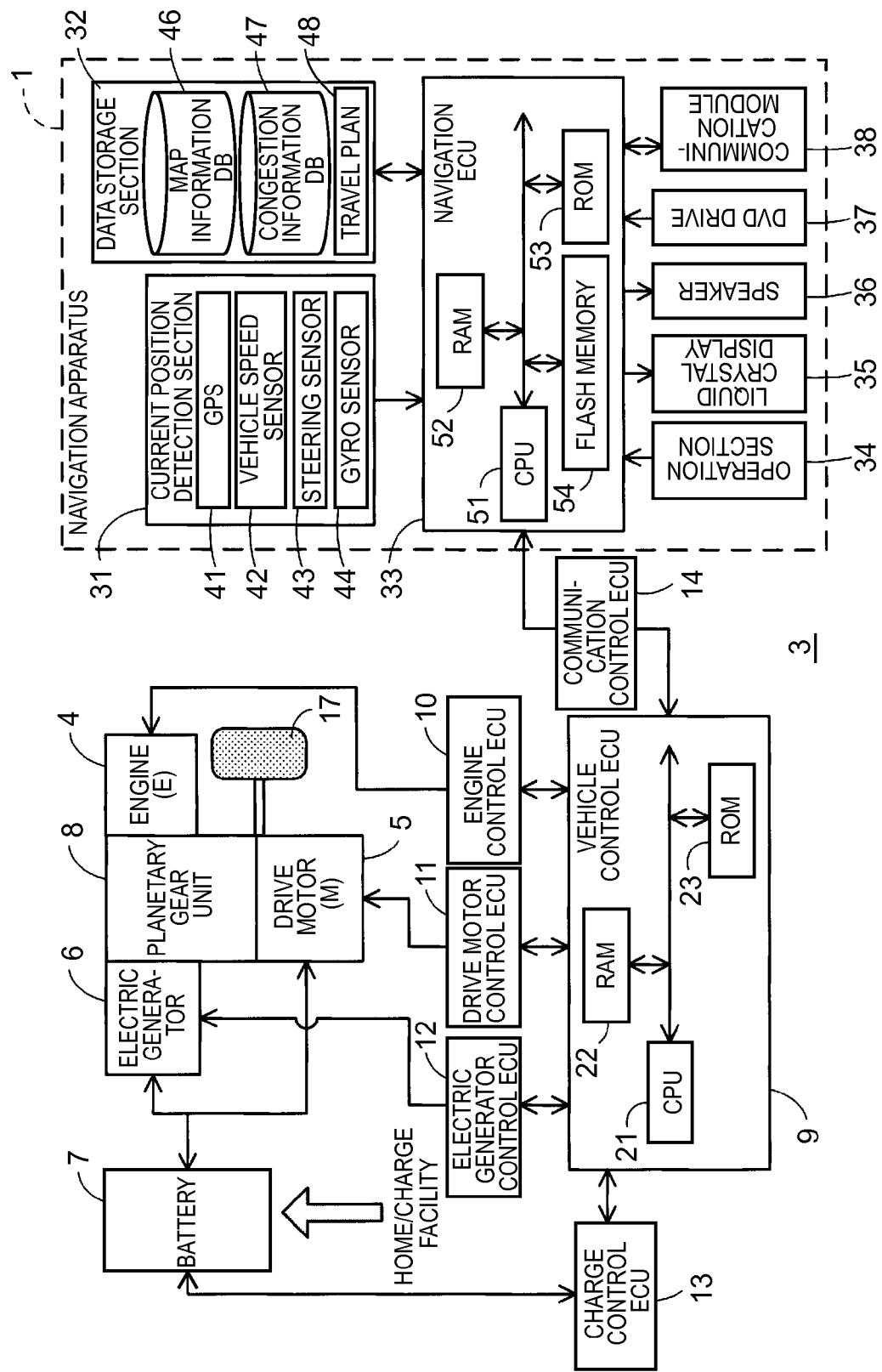
FIG. 2 is a block diagram schematically illustrating a control system of the vehicle control system according to the embodiment.

First, a schematic configuration of a vehicle control system 3 for a vehicle 2 on which a navigation apparatus 1 according to the embodiment is mounted as an in-vehicle device will be described with reference to FIGS. 1 and 2. FIG. 1 illustrates a schematic configuration of the vehicle control system 3 according to the embodiment. FIG. 2 is a block diagram schematically illustrating a control system of the vehicle control system 3 according to the embodiment. The vehicle 2 is a hybrid vehicle that uses a motor and an engine as drive sources. In the embodiment described below, in particular, the vehicle 2 is a plug-in hybrid vehicle with a battery that can be charged from an external power source.

As illustrated in FIGS. 1 and 2, the vehicle control system 3 according to the embodiment is basically composed of the navigation apparatus 1 installed in the vehicle 2, an engine 4, a drive motor 5, an electric generator 6, a battery 7, a planetary gear unit 8, a vehicle control ECU 9, an engine control ECU 10, a drive motor control ECU 11, an electric generator control ECU 12, a charge control ECU 13, and a communication control ECU 14.

The navigation apparatus 1 is provided in a center console or a panel surface in the cabin of the vehicle 2, and includes a liquid crystal display 35 that displays a map of an area around the vehicle and an expected travel route to a destination location, a speaker 36 that outputs audio route guidance, and so forth. The navigation apparatus 1 specifies the current position of the vehicle 2 through a GPS or the like, and in the case where a destination location is set, explores for a route from a departure location (e.g. the current position) to the destination location and provides guidance on the set expected travel route using the liquid crystal display 35 and the speaker 36. In addition, the navigation apparatus 1 prepares a travel plan, which is a control schedule for controlling drive sources (the engine 4 and the drive motor 5) of the vehicle 2 on the basis of congestion information or the like, in the case where the expected travel route from the departure location to the destination location is set as discussed later. The configuration of the navigation apparatus 1 will be discussed in detail later.

The engine 4 is an engine such as an internal combustion engine driven on fuel such as gasoline, light oil, and ethanol, and is used as a first drive source of the vehicle 2. Engine torque which is a drive force of the engine 4 is transferred to the planetary gear unit 8, which distributes a part of the engine torque to drive wheels 17, which rotate to drive the vehicle 2.

The drive motor 5 is a motor rotated on the basis of electric power supplied from the battery 7, and is used as a second drive source of the vehicle 2. The drive motor is driven on electric power supplied from the battery 7 to generate drive motor torque which is torque of the drive motor 5. The generated drive motor torque rotates the drive wheels 17 to drive the vehicle 2. Further, when engine braking is required or the vehicle is braking to a stop, the drive motor 5 functions as a regenerative brake to regenerate vehicle inertial energy as electrical energy.

In the plug-in hybrid vehicle according to the embodiment, in addition, in the case where the travel plan to be discussed later has been prepared in the navigation apparatus 1, the engine 4 and the drive motor 5 are basically controlled on the basis of the prepared travel plan. Specifically, in an EV travel section specified in the travel plan, so-called EV travel in which the vehicle travels using only the drive motor 5 as a drive source is performed. In an HV travel section specified in the travel plan, meanwhile, so-called HV travel in which the vehicle travels using both the engine 4 and the drive motor 5 as drive sources is performed. In the HV travel, the vehicle travels while switching the drive source in accordance with the travel status such as when the vehicle is starting, when the vehicle is stationary, and when the vehicle is traveling at a high speed. Specifically, switching is performed in accordance with the travel status among travel in which only the engine 4 is used as a drive source, travel in which only the drive motor 5 is used as a drive source, and travel in which both the engine 4 and the drive motor 5 are used as drive sources.

In the case where the travel plan has not been prepared in the navigation apparatus 1, on the other hand, the EV travel is basically performed until the remaining capacity of the battery 7 becomes equal to or less than a predetermined value. After the remaining capacity of the battery 7 becomes equal to or less than the predetermined value, the HV travel is performed.

The electric generator 6 is an electric generation device driven by a part of the engine torque distributed by the planetary gear unit 8 to generate electric power. The electric generator 6 is connected to the battery 7 via an electric generator inverter (not illustrated) so that a generated AC current is converted into a DC current to be supplied to the battery 7. The drive motor 5 and the electric generator 6 may be formed integrally with each other.

The battery 7 is a secondary battery that serves as power accumulation device that can repeatedly charge and discharge electricity. Examples of the battery 7 include a lead-acid battery, a capacitor, a nickel-cadmium battery, a nickel-hydrogen battery, a lithium-ion battery, and a sodium-sulfur battery. Further, the battery 7 is connected to a charge connector 18 provided on a sidewall of the vehicle 2. The battery 7 can be charged by connecting the charge connector 18 to an electric power supply source such as an outlet at home or at a charge facility provided with predetermined charge equipment. Further, the battery 7 may also be charged by regenerative electric power generated by the drive motor and electric power generated by the electric generator 6.

The planetary gear unit 8 includes a sun gear, a pinion, a ring gear, and a carrier, and distributes a part of the drive force of the engine 4 to the electric generator 6 and transfers the remaining drive force to the drive wheels 17.

The vehicle control ECU (electronic control unit) 9 is an electronic control unit that controls the entire vehicle 2. The vehicle control ECU 9 is connected to the engine control ECU 10 which controls the engine 4, the drive motor control ECU 11 which controls the drive motor 5, the electric generator control ECU 12 which controls the electric generator 6, and the charge control ECU 13 which controls the battery 7, and connected to a plurality of in-vehicle devices including the navigation apparatus 1 via an in-vehicle network such as a CAN in a mutually communicable manner.

The vehicle control ECU 9 includes a CPU 21 that serves as a computation device and a control device, and internal storage devices such as a RAM 22 used as a working memory when the CPU 21 performs various computation processes and a ROM 23 that stores a control program etc.

The engine control ECU 10, the drive motor control ECU 11, the electric generator control ECU 12, and the charge control ECU 13 each include a CPU, a RAM, a ROM, and so forth (not illustrated), and control the engine 4, the drive motor 5, the electric generator 6, and the battery 7, respectively.

The communication control ECU 14 controls communication performed between the various in-vehicle devices including the navigation apparatus 1 and the vehicle control ECU 9.

Subsequently, the configuration of the navigation apparatus 1 will be described with reference to FIG. 2.

As illustrated in FIG. 2, the navigation apparatus 1 according to the embodiment is composed of: a current position detection section 31 that detects the current position of the vehicle on which the navigation apparatus 1 is mounted; a data storage section 32 that stores various data; a navigation ECU 33 that performs various computation processes on the basis of input information; an operation section 34 that receives an operation from a user; the liquid crystal display 35 which displays a map of an area around the vehicle and facility information on facilities to the user; the speaker 36 which outputs audio route guidance; a DVD drive 37 that reads a DVD that serves as a storage medium; and a communication module 38 that communicates with an information center such as a probe center and a VICS (registered trademark: Vehicle Information and Communication System) center.

The constituent elements of the navigation apparatus 1 will be described below in order.

The current position detection section 31 is composed of a GPS 41, a vehicle speed sensor 42, a steering sensor 43, a gyro sensor 44, and so forth, and can detect the current position of the vehicle, the orientation, the travel speed of the vehicle, the current time, and so forth. In particular, the vehicle speed sensor 42 is a sensor for detecting the travel distance of the vehicle and the vehicle speed, and generates pulses in accordance with rotation of the drive wheels of the vehicle to output a pulse signal to the navigation ECU 33. The navigation ECU 33 counts the generated pulses to calculate the rotational speed of the drive wheels and the travel distance. It is not necessary that the navigation apparatus 1 should include all of the four sensors, and the navigation apparatus 1 may be configured to include only one or some of such sensors.

The data storage section 32 includes: a hard disk (not illustrated) that serves as an external storage device and a storage medium; and a recording head (not illustrated) that serves as a driver that reads a map information DB 46, a congestion information DB 47, a travel plan 48, a predetermined program, and so forth stored in the hard disk and writes predetermined data into the hard disk. The data storage section 32 may be constituted of a memory card or an optical disk such as a CD or a DVD in place of the hard disk.

The map information DB 46 is storage unit for storing link data on roads (links), node data on node points, branch point data on branch points, location data on locations such as facilities, map display data for displaying a map, exploration data for exploring for a route, search data for searching for a location, and so forth, for example. The link data also include information on inclined sections (including information on the inclination angle) and information on curves (including information on the start point, the end point, and the turning radius). The map information DB 46 may be stored in an external server so that the navigation apparatus 1 acquires the link data etc. through communication.

The congestion information DB 47 is a storage unit for cumulatively storing congestion information acquired from a traffic information center such as the VICS center for a certain period. The congestion information stored in the congestion information DB 47 includes the congestion degree which indicates the degree of congestion, the congestion start position and the congestion length which indicate the section of the congestion degree, the travel time, and so forth. The congestion degree is information that indicates the degree of congestion, and includes "congested", "crowded", and "uncrowded" data in the descending order of the degree of congestion. The congestion degree is decided on the basis of the attribute (an intercity highway, an intracity highway, or a general road) of the road and the average vehicle speed of vehicles that pass through the road. On a general road, by way of example, the congestion degree is decided as "congested" if the average vehicle speed is equal to or less than 10 km, decided as "crowded" if the average vehicle speed is more than 10 km and less than 20 km, and decided as "uncrowded" if the average vehicle speed is equal to or more than 20 km. The navigation apparatus 1 acquires new congestion information from a traffic information center such as the VICS center via a communication network such as optical beacon and FM multiplex broadcasting each predetermined time (e.g. every five minutes), and stores the congestion information in the congestion information DB 47. The congestion information stored in the congestion information DB 47 is held for a certain period (e.g. one hour), and used to prepare a travel plan as discussed later.

The congestion information stored in the congestion information DB 47 will be described in more detail below with reference to FIG. 3. FIG. 3 illustrates an example of the congestion information stored in the congestion information DB 47.

As illustrated in FIG. 3, the congestion information is composed of a VICS link number that identifies a link, the congestion degree of the link, the congestion start position and the congestion length which indicate the section of the congestion degree, the travel time, and so forth. For example, the congestion information illustrated in FIG. 3 is information generated during five minutes from 13:56 to 14:01 on Jan. 6, 2013 and distributed at 14:01, and indicates that the congestion degree is "congested" in all sections and the travel time is seven minutes for a link with a VICS link number of "533945-4-4". For a link with a VICS link number of "533946-10-2", in addition, the congestion information indicates that the congestion degree is "crowded" in all sections and the travel time is five minutes. For a link with a VICS link number of "533947-6-1", further, the congestion information indicates that the congestion degree is "crowded" in a section of 200 m from a location A and the travel time is three minutes. The congestion information DB 47 may also store information other than the congestion information, such as restriction information, parking lot information, service area information, and parking area information, for example.

The link number (VICS link number) used in the VICS data and the link number used by the navigation apparatus 1 are different from each other. In addition, the differentiation of links is also different between the VICS data and the navigation apparatus 1. Thus, in the case where the navigation apparatus 1 acquires congestion information from the VICS center, it is necessary to convert the congestion information into congestion information based on the link differentiation prescribed by the navigation apparatus 1.

The travel plan 48 is a control schedule prepared by the navigation ECU 33 in the case where an expected travel route is set in the navigation apparatus 1 to decide how to control the engine 4 and the drive motor 5 when the vehicle 2 travels along the expected travel route.

In the travel plan 48, each section (in the embodiment, in particular, each link) of the expected travel route, for example, is set to one of an EV travel section in which EV travel is performed and an HV travel section in which HV travel is performed. For example, FIG. 4 illustrates an example of the travel plan 48 prepared when the vehicle travels along an expected travel route composed of links a to e. In the travel plan 48 illustrated in FIG. 4, the link a is differentiated as an EV travel section, the links b and c are differentiated as an HV travel section, the link d is differentiated as an EV travel section, and the link e is differentiated as an HV travel section. A section of the travel plan 48 for which the fuel efficiency is predicted to be high if the EV travel is performed on the basis of the congestion information on the expected travel route, link information (such as the shape of the road, the gradient, and the average vehicle speed), and vehicle information (such as the front projected area, the inertia weight of the drive mechanism, the vehicle weight, the rolling resistance coefficient of the drive wheels, the air resistance coefficient, and the cornering resistance) is set as an EV travel section, and a section of the travel plan 48 for which the fuel efficiency is predicted to be high if the HV travel is performed is set as an HV travel section. In the case where the operation mode of the vehicle is a long operation mode as discussed later, the travel plan 48 is prepared for the entire expected travel route (in the case where the total length of the travel route is particularly long, within a predetermined distance (e.g. 200 km) from the departure location) as illustrated in FIG. 4. In the case where the operation mode of the vehicle is a middle operation mode, on the other hand, the travel plan 48 is prepared for only a range within a predetermined distance (e.g. within three km) ahead of the current position of the vehicle in the travel direction as illustrated in FIG. 5. In the middle operation mode, in particular, a target value for the remaining capacity of the battery 7 is set, and the travel plan 48 is prepared so as to achieve the target value. Besides the EV travel section and the HV travel section, an unspecified travel section in which it is decided on the basis of the remaining capacity of the battery 7 which of the EV travel and the HV travel is to be performed may be set.

When the vehicle 2 travels along the expected travel route, the navigation ECU 33 determines on the basis of the current position of the vehicle 2 and the travel plan 48 whether or not the timing to change travel control (from the EV travel to the HV travel or from the HV travel to the EV travel) has come. In the case where it is determined that the timing to change the travel control has come, a control instruction that indicates the EV travel or the HV travel is transmitted to the vehicle control ECU 9. When a control instruction that designates the EV travel is received, the vehicle control ECU 9 starts the EV travel in which the drive motor 5 is controlled via the drive motor control ECU 11 so as to use only the drive motor 5 as a drive source. When a control instruction that designates the HV travel is received, meanwhile, the vehicle control ECU 9 starts the HV travel in which the engine 4 and the drive motor 5 are controlled via the engine control ECU 10 and the drive motor control ECU 11, respectively, in accordance with the travel status so as to use both the engine 4 and the drive motor 5 as drive sources. During the HV travel, the electric generator 6 is driven in a predetermined section (e.g. a section in which the vehicle 2 steadily travels at a high speed) to charge the battery 7.

The congestion information DB 47 and the travel plan 48 may be stored in an external server to be updated or acquired by the navigation apparatus 1 through communication.

The navigation ECU (electronic control unit) 33 is an electronic control unit that controls the entire navigation apparatus 1, and includes a CPU 51 that serves as a computation device and a control device, and internal storage devices such as a RAM 52 that is used as a working memory when the CPU 51 performs various computation processes and that stores route data etc. when a route is found, a ROM 53 that stores a control program, a travel assist process program (see FIG. 6) to be discussed later, vehicle information on the vehicle such as the vehicle weight, and so forth, and a flash memory 54 that stores a program read from the ROM 53. The navigation ECU 33 constitutes various modules as process algorithms. For example, travel planning modules prepares a travel plan in which the EV travel section and the HV travel section are set for the expected travel route. Congestion information acquisition module acquires congestion information on the expected travel route. Vehicle state acquisition module acquires the state of the vehicle. Variation determination module determines whether or not the congestion status of the expected travel route has been varied from the congestion information using a criterion based on the state of the vehicle. Travel plan correction module corrects the travel plan, in the case where it is determined that the congestion status of the expected travel route has been varied, using the congestion status after the variation.

The operation section 34 is operated to input a departure location at which travel is started and a destination location at which travel is ended, and composed of a plurality of operation switches (not illustrated) such as various keys and buttons. The navigation ECU 33 performs control so as to execute various corresponding operation on the basis of a switch signal output in response to a depression of a switch or the like. The operation section 34 may be composed of a touch panel provided on the front surface of the liquid crystal display 35. The operation section 34 may be composed of a microphone and a speech recognition device.

The liquid crystal display 35 displays a map image including roads, traffic information, operational guidance, an operation menu, key guidance, an expected travel route from a departure location to a destination location, guidance information on a travel along the expected travel route, news, weather forecasts, the time, mails, television programs, and so forth.

The speaker 36 outputs audio guidance on a travel along a guide route and guidance on traffic information on the basis of an instruction from the navigation ECU 33.

The DVD drive 37 is a drive that can read data stored in a storage medium such as a DVD and a CD. Music and video is reproduced, the map information DB 46 is updated, etc. on the basis of the read data.

The communication module 38 is a communication device that receives traffic information composed of congestion information, restriction information, traffic accident information, and so forth transmitted from a traffic information center, e.g. the VICS (registered trademark) center and a probe center, and may be a cellular phone or a DCM, for example.

Figures 6, 7:
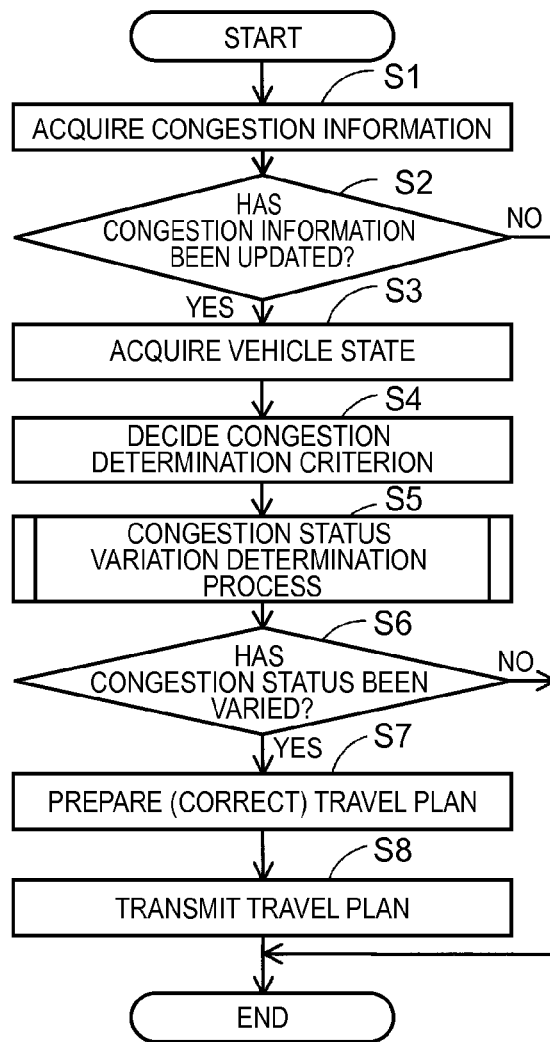
FIG. 6 is a flowchart of a travel assist process program according to the embodiment.
FIG. 7 illustrates a method of deciding a congestion determination criterion.

Subsequently, a travel assist process program executed by the navigation ECU 33 of the navigation apparatus 1 configured as described above will be described with reference to FIG. 6. FIG. 6 is a flowchart of the travel assist process program according to the embodiment. The travel assist process program is a program executed at the timing when congestion information is transmitted from the VICS center (e.g. at intervals of five minutes) to correct the travel plan 48 prepared on a travel along the expected travel route. The program illustrated in the flowchart of FIGS. 6, 8, 9, 11, and 14 described below is stored in the RAM 52 and the ROM 53 of the navigation apparatus 1, and executed by the CPU 51.

In the travel assist process program, first, in step (hereinafter abbreviated as "S") 1, the CPU 51 acquires congestion information transmitted from the VICS center. The congestion information includes the congestion degree which indicates the degree of congestion and the section for indicating the congestion degree (the congestion start position and the congestion length) (see FIG. 3). The acquired congestion information is cumulatively stored in the congestion information DB 47.

Next, in S2, the CPU 51 compares the last acquired congestion information with the congestion information acquired one cycle earlier, among the congestion information stored in the congestion information DB 47, to determine whether or not the congestion information on the expected travel route for the vehicle has been updated. The case where the congestion information has been updated includes not only a case where the congestion degree has been varied but also a case where the congestion degree is the same and only the section for indicating the congestion degree (the congestion start position and the congestion length) has been varied.

In the case where it is determined that the congestion information on the expected travel route for the vehicle has been updated (S2: YES), the process proceeds to S3. In the case where it is determined that the congestion information on the expected travel route for the vehicle has not been updated (S2: NO), in contrast, the travel assist process program is ended without correcting the current travel plan 48.

In S3, the CPU 51 communicates with the vehicle control ECU 9 and the communication control ECU 14 via the CAN to acquire the vehicle state. In the embodiment, the following (A) to (C) are acquired as the vehicle state:

(A) the operation mode (the long operation mode or the middle operation mode) of the vehicle;

(B) the load status of communication; and (C) the resource of the communication control ECU 14.

The operation mode of the vehicle is specified as one of the long operation mode and the middle operation mode. In the long operation mode, the travel plan 48 is prepared for the entire expected travel route (in the case where the total length of the travel route is particularly long, within a predetermined distance (e.g. 200 km) from the departure location) (FIG. 4) to control drive of the drive motor 5 and the engine 4 in accordance with the prepared travel plan 48. In the middle operation mode, meanwhile, the travel plan 48 is prepared for only a range within a predetermined distance (e.g. within 3 km) ahead of the current position of the vehicle in the travel direction (FIG. 5) to control drive of the drive motor 5 and the engine 4 in accordance with the prepared travel plan 48. In the middle operation mode, a target value for the remaining capacity of the battery 7 is set, and the travel plan 48 is prepared so as to achieve the target value. For a plug-in hybrid vehicle, the long operation mode is basically set since the start of travel until the remaining battery capacity becomes equal to or less than a predetermined criterion value (e.g. 10%), and a transition is made to the middle operation mode when the remaining battery capacity becomes equal to or less than the predetermined criterion value.

Next, in S4, the CPU 51 decides a congestion determination criterion on the basis of the vehicle state acquired in S3. The congestion determination criterion is a criterion for determining whether or not the congestion status of the expected travel route has been varied.

In the embodiment, the following five criteria (1) to (5) are provided as the congestion determination criterion:

(1) It is determined that the congestion status of the expected travel route has been varied if the congestion information on the expected travel route has been updated even if only slightly.

(2) A comparison is made between the congestion degrees for the entire expected travel route, and it is determined that the congestion status of the expected travel route has been varied if there is any portion, the congestion degree in which has been varied.

(3) A comparison is made between the congestion degrees for the entire expected travel route, and it is determined that the congestion status of the expected travel route has been varied if there is any portion for which the congestion degree has been varied. It should be noted, however, that a crowded portion is deemed as an uncrowded portion.

(4) A comparison is made between the congestion degrees determined using a middle determination criterion in the unit of link, and it is determined that the congestion status of the expected travel route has been varied if there is any link, the congestion degree of which has been varied.

(5) A comparison is made between the congestion degrees determined using a long determination criterion in the unit of link, and it is determined that the congestion status of the expected travel route has been varied if there is any link, the congestion degree of which has been varied.

When the middle determination criterion is used, the congestion degree of a link is determined to be congested if there is any congested section in at least a part of the link, the congestion degree of a link is determined to be crowded if there is no congested section in the link and there is any crowded section in at least a part of the link, and the congestion degree of the remaining links is determined to be uncrowded.

When the long determination criterion is used, meanwhile, the congestion degree of a link is determined to be congested if half or more portions of the link are determined to be congested sections, and the congestion degree of the remaining links is determined to be uncrowded.

It is most likely to be determined that the congestion status of the expected travel route has been varied when the congestion determination criterion (1), among (1) to (5), is used. It is less and less likely to be determined that the congestion status of the expected travel route has been varied when the congestion determination criteria (2) to (5) are used in this order.

In S4, the CPU 51 decides the congestion determination criterion in accordance with a combination of: (A) the operation mode (the long operation mode or the middle operation mode) of the vehicle; (B) the load status of communication, and (C) the resource of the communication control ECU 14 acquired in S3 as illustrated in FIG. 7. For example, in the case where the load status of communication is higher than a predetermined reference value, the resource of the communication ECU 14 is less than a predetermined reference value, and the operation mode of the vehicle is the middle operation mode, the congestion determination criterion (2) is decided. The reference values are a load upper limit and a resource lower limit that allow CAN communication to be performed normally in the vehicle, and are stored in the RAM 52 or the like.

Next, in S5, the CPU 51 executes a congestion status variation determination process (FIG. 8) to be discussed later. In the congestion status variation determination process, it is determined on the basis of the congestion information stored in the congestion information DB 47 and the congestion determination criterion decided in S4 whether or not the congestion status of the expected travel route has been varied.

Subsequently, in S6, the CPU 51 determines whether or not it is determined in the congestion status variation determination process in S5 that the congestion status of the expected travel route has been varied.

In the case where it is determined in the congestion status variation determination process in S5 that the congestion status of the expected travel route has been varied (S6: YES), the process proceeds to S7. In the case where it is determined in the congestion status variation determination process in S5 that the congestion status of the expected travel route has not been varied (S6: NO), in contrast, the travel assist process program is ended without correcting the current travel plan 48.

In S7, the CPU 51 reprepares (corrects) the current travel plan 48 using the congestion status of the expected travel route after the variation. Specifically, a section for which the fuel efficiency is predicted to be high if the EV travel is performed on the basis of the congestion information on the expected travel route, link information (such as the shape of the road, the gradient, and the average vehicle speed), and vehicle information (such as the front projected area, the inertia weight of the drive mechanism, the vehicle weight, the rolling resistance coefficient of the drive wheels, the air resistance coefficient, and the cornering resistance) is set as an EV travel section, and a section for which the fuel efficiency is predicted to be high if the HV travel is performed is set as an HV travel section (FIGS. 4 and 5). In the middle operation mode, in particular, a target value for the remaining capacity of the battery 7 is set, and the travel plan 48 is prepared so as to achieve the target value.

In S8, the CPU 51 transmits the corrected travel plan 48 to the vehicle control ECU 9 via the CAN. In the vehicle, the engine 4 and the drive motor 5 are controlled on the basis of the travel plan 48 prepared in the navigation apparatus 1 and transmitted to the vehicle control ECU 9. Specifically, in an EV travel section specified in the travel plan 48, EV travel in which the vehicle travels using only the drive motor 5 as a drive source is performed. In an HV travel section specified in the travel plan 48, meanwhile, HV travel in which the vehicle travels using both the engine 4 and the drive motor 5 as drive sources is performed. In the HV travel, the vehicle travels while switching the drive source in accordance with the travel status such as when the vehicle is starting, when the vehicle is stationary, and when the vehicle is traveling at a high speed. Specifically, switching is performed in accordance with the travel status among travel in which only the engine 4 is used as a drive source, travel in which only the drive motor 5 is used as a drive source, and travel in which both the engine 4 and the drive motor 5 are used as drive sources.

Figure 8:
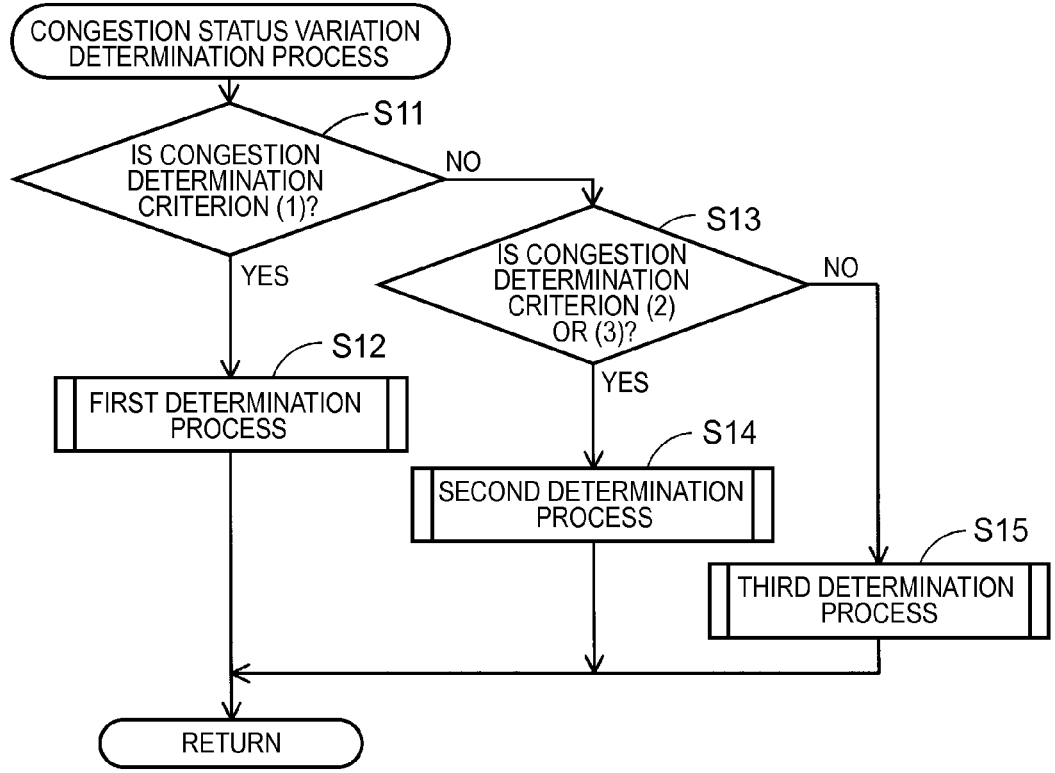
FIG. 8 is a flowchart of a sub process program of a congestion status variation determination process according to the embodiment.

Next, a sub process of the congestion status variation determination process executed in S5 will be described with reference to FIG. 8. FIG. 8 is a flowchart of a sub process program of the congestion status variation determination process.

First, in S11, the CPU 51 determines whether or not the congestion determination criterion decided in S4 is the determination criterion (1).

In the case where it is determined that the congestion determination criterion decided in S4 is the determination criterion (1) (S11: YES), the process proceeds to S12 to execute a first determination process (FIG. 9) to be discussed later. After that, the process proceeds to S6.

In the case where it is determined that the congestion determination criterion decided in S4 is not the determination criterion (1) (S11: NO), in contrast, the process proceeds to S13.

In S13, the CPU 51 determines whether or not the congestion determination criterion decided in S4 is the determination criterion (2) or (3).

In the case where it is determined that the congestion determination criterion decided in S4 is the determination criterion (2) or (3) (S13: YES), the process proceeds to S14 to execute a second determination process (FIG. 11) to be discussed later. After that, the process proceeds to S6.

In the case where it is determined that the congestion determination criterion decided in S4 is not the determination criterion (2) or (3) (S13: NO), that is, in the case where it is determined that the congestion determination criterion decided in S4 is the determination criterion (4) or (5), the process proceeds to S15 to execute a third determination process (FIG. 14) to be discussed later. After that, the process proceeds to S6.

Figure 9:
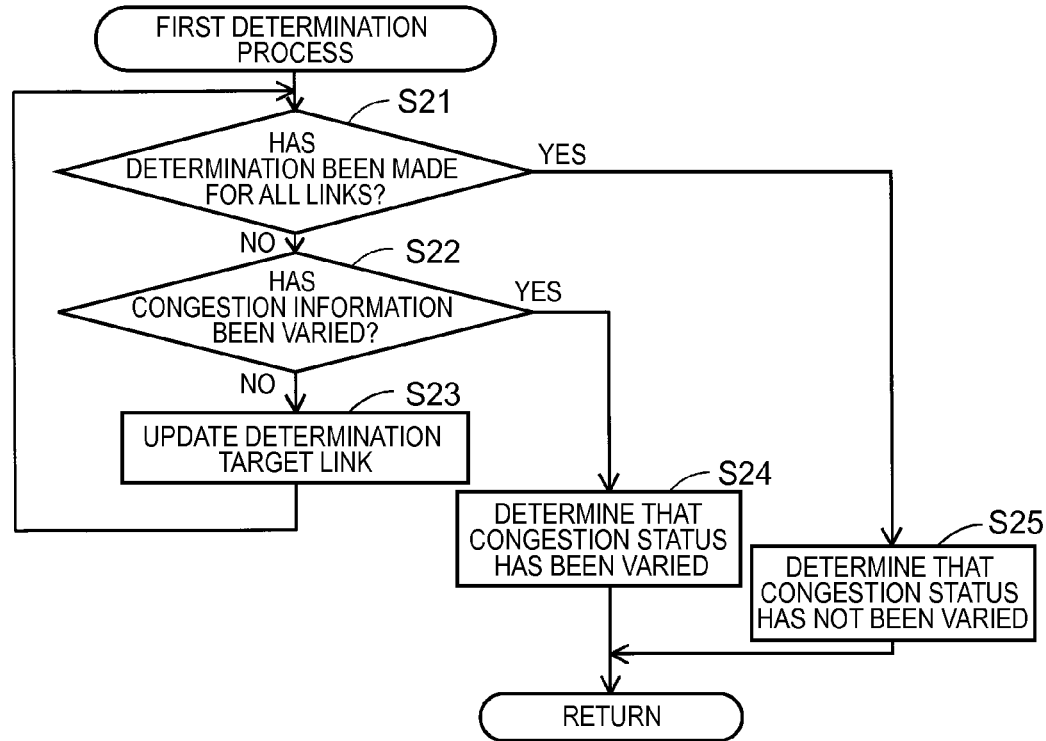
FIG. 9 is a flowchart of a sub process program of a first determination process according to the embodiment.

Next, a sub process of the first determination process executed in S12 will be described with reference to FIG. 9. FIG. 9 is a flowchart of a sub process program of the first determination process.

First, in S21, the CPU 51 determines whether or not a determination process in S22 has been performed for all the links that compose the expected travel route.

In the case where it is determined that the determination process in S22 has been performed for all the links that compose the expected travel route (S21: YES), the process proceeds to S25. In the case where it is determined that the determination process in S22 has not been performed for all the links that compose the expected travel route (S21: NO), the process proceeds to S22.

In S22, the CPU 51 compares the last acquired congestion information with the congestion information acquired one cycle earlier (the congestion degree and the section for indicating the congestion degree), among the congestion information stored in the congestion information DB 47, for a determination target link (which is selected in the order of closeness from the departure location), among the links that compose the expected travel route. The CPU 51 thus determines whether or not the congestion information has been varied (that is, whether or not one of the congestion degree and the section for indicating the congestion degree (the congestion length and the congestion start position) specified by the congestion information has been varied).

In the case where it is determined that the congestion information for the link has been varied (S22: YES), the process proceeds to S24. In the case where it is determined that the congestion information for the link has not been varied (S22: NO), in contrast, the process proceeds to S23.

In S23, the CPU 51 updates the determination target link, among the links that compose the expected travel route, to the next link. After that, the process returns to S21, and the processes in and after S22 are performed for the link after the update.

In S24, the CPU 51 determines that the congestion status of the expected travel route has been varied. After that, the process proceeds to S6. As a result, the travel plan 48 is corrected in S7.

In S25, on the other hand, the CPU 51 determines that the congestion status of the expected travel route has not been varied. After that, the process proceeds to S6. As a result, the travel plan 48 is not corrected.

Figure 10:
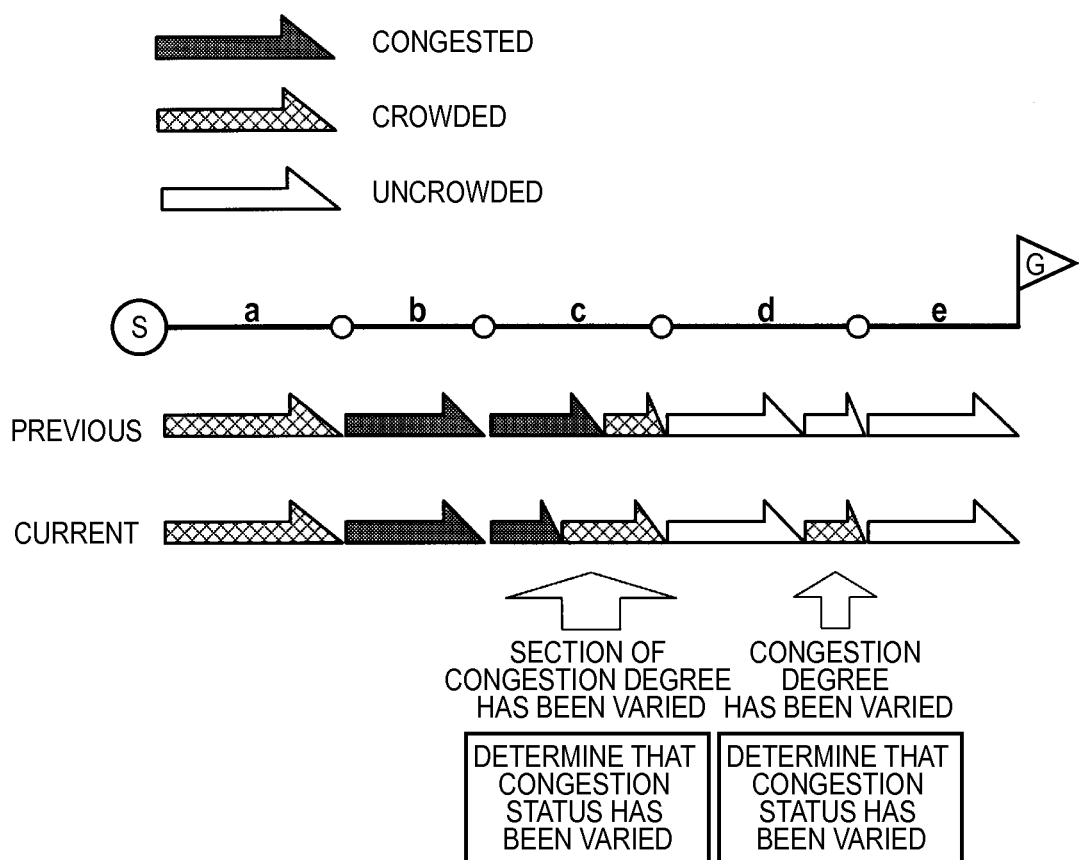
FIG. 10 illustrates a specific example in which it is determined in the first determination process whether or not the congestion status of an expected travel route has been varied.

In the first determination process (FIG. 9) executed in the case where the congestion determination criterion is (1), as illustrated in FIG. 10, it is determined that the congestion status of the expected travel route has been varied if there is any link, the section for indicating the congestion degree of which has been varied or the congestion degree of which has been varied in some or all of the links, among the links that compose the expected travel route.

Figure 11:
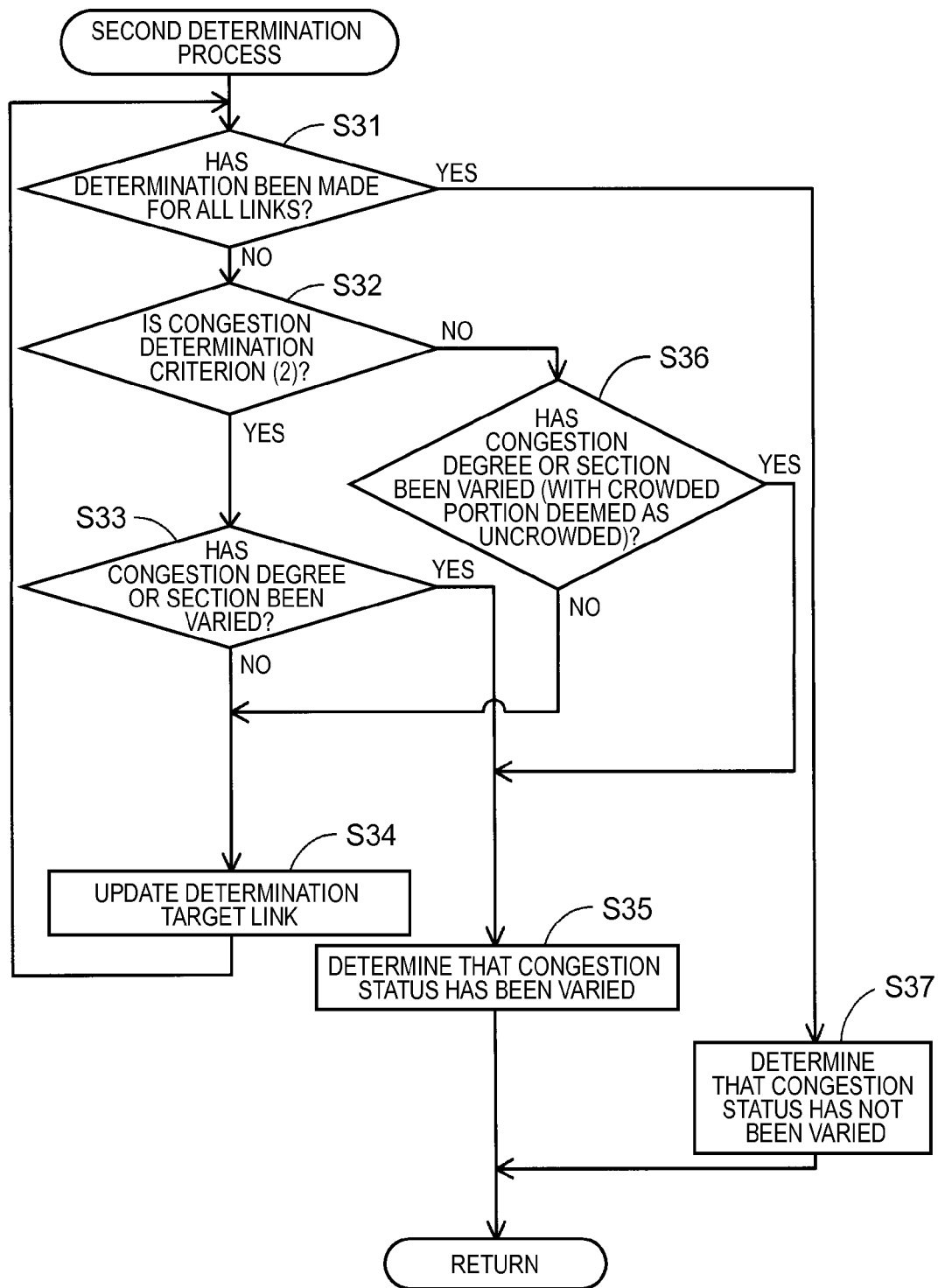
FIG. 11 is a flowchart of a sub process program of a second determination process according to the embodiment.

Next, a sub process of the second determination process executed in S14 will be described with reference to FIG. 11. FIG. 11 is a flowchart of a sub process program of the second determination process.

First, in S31, the CPU 51 determines whether or not determination processes in and after S32 have been performed for all the links that compose the expected travel route.

In the case where it is determined that the determination processes in and after S32 have been performed for all the links that compose the expected travel route (S31: YES), the process proceeds to S37. In the case where it is determined that the determination processes in and after S32 have not been performed for all the links that compose the expected travel route (S31: NO), the process proceeds to S32.

In S32, the CPU 51 determines whether or not the congestion determination criterion decided in S4 is the determination criterion (2).

In the case where it is determined that the congestion determination criterion decided in S4 is the determination criterion (2) (S32: YES), the process proceeds to S33. In the case where it is determined that the congestion determination criterion decided in S4 is the determination criterion (3) (S32: NO), in contrast, the process proceeds to S36.

In S33, the CPU 51 compares the last acquired congestion information with the congestion information acquired one cycle earlier (the congestion degree and the section for indicating the congestion degree), among the congestion information stored in the congestion information DB 47, for a determination target link (which is selected in the order of closeness from the departure location), among the links that compose the expected travel route. The CPU 51 thus determines whether or not one of the congestion degree of the link and the section for indicating the congestion degree (the congestion length and the congestion start position) specified by the congestion information has been varied.

In the case where it is determined that one of the congestion degree of the link and the section for indicating the congestion degree (the congestion length and the congestion start position) has been varied (S33: YES), the process proceeds to S35. In the case where it is determined that none of the congestion degree of the link and the section for indicating the congestion degree (the congestion length and the congestion start position) has been varied (S33: NO), the process proceeds to S34.

In S34, the CPU 51 updates the determination target link, among the links that compose the expected travel route, to the next link. After that, the process returns to S31, and the processes in and after S32 are performed for the link after the update.

In S35, the CPU 51 determines that the congestion status of the expected travel route has been varied. After that, the process proceeds to S6. As a result, the travel plan 48 is corrected in S7.

In S36, on the other hand, the CPU 51 compares the last acquired congestion information with the congestion information acquired one cycle earlier (the congestion degree and the section for indicating the congestion degree), among the congestion information stored in the congestion information DB 47, for a determination target link (which is selected in the order of closeness from the departure location), among the links that compose the expected travel route. The CPU 51 thus determines whether or not one of the congestion degree of the link and the section for indicating the congestion degree (the congestion length and the congestion start position) specified by the congestion information has been varied. It should be noted, however, that in the determination process in S36, the congestion degree of a crowded portion is not taken into consideration (that is, a crowded section is deemed as uncrowded).

In the case where it is determined that one of the congestion degree of the link and the section for indicating the congestion degree (the congestion length and the congestion start position) has been varied (S36: YES), the process proceeds to S35. In the case where it is determined that none of the congestion degree of the link and the section for indicating the congestion degree (the congestion length and the congestion start position) has been varied (S36: NO), the process proceeds to S34.

In S37, on the other hand, the CPU 51 determines that the congestion status of the expected travel route has not been varied. After that, the process proceeds to S6. As a result, the travel plan 48 is not corrected.

Figure 12:
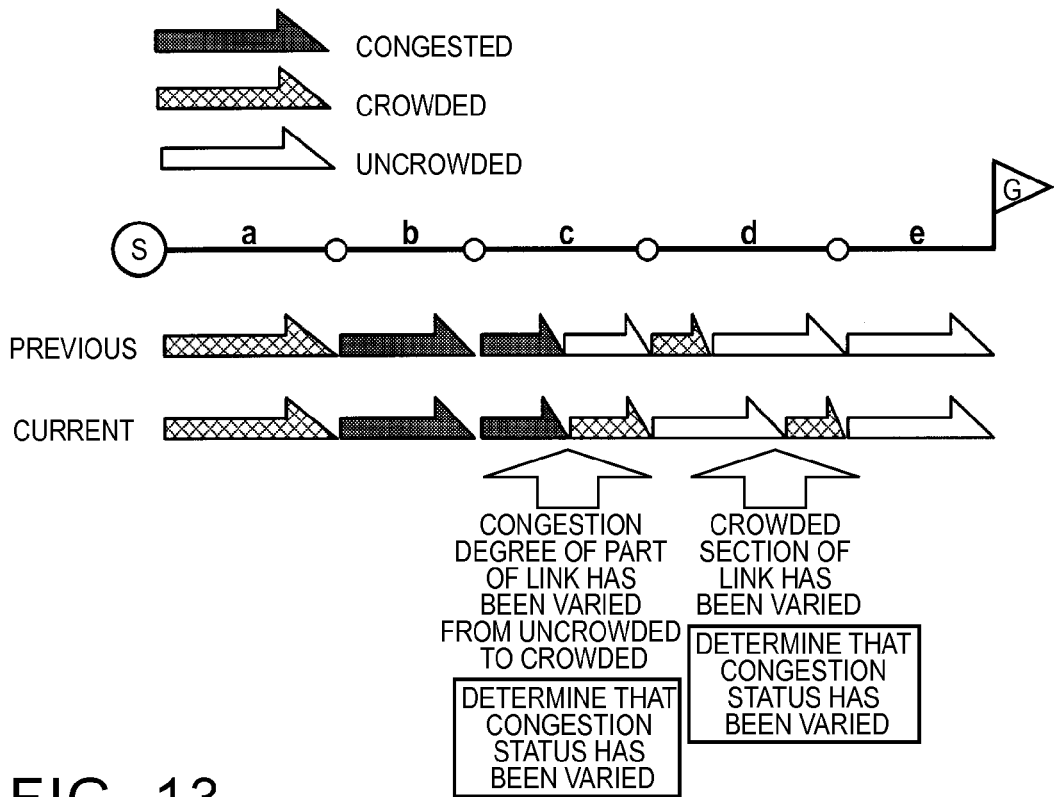
FIG. 12 illustrates a specific example in which it is determined in the second determination process whether or not the congestion status of the expected travel route has been varied.

In the second determination process (FIG. 11) executed in the case where the congestion determination criterion is (2), as illustrated in FIG. 12, it is determined that the congestion status of the expected travel route has been varied if there is any link, the section for indicating the congestion degree of which has been varied or the congestion degree of which has been varied, among the links that compose the expected travel route. As the congestion degree, crowded is differentiated from congested and uncrowded, and subjected to a determination. Thus, also in the case where the congestion degree has been varied from uncrowded to crowded and in the case where the section for indicating crowded has been varied, it is determined that the congestion status of the expected travel route has been varied.

Figure 13:
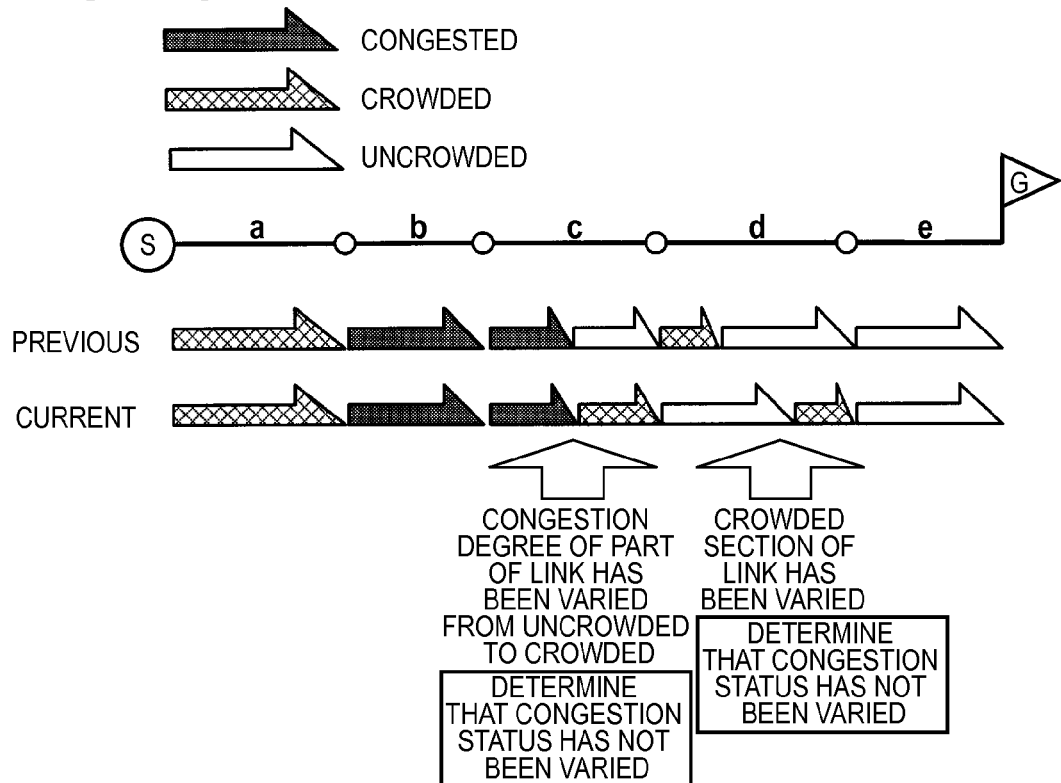
FIG. 13 illustrates a specific example in which it is determined in the second determination process whether or not the congestion status of the expected travel route has been varied.

On the other hand, in the second determination process (FIG. 11) executed in the case where the congestion determination criterion is (3), as illustrated in FIG. 13, it is determined that the congestion status of the expected travel route has been varied if there is any link, the section for indicating the congestion degree of which has been varied or the congestion degree of which has been varied, among the links that compose the expected travel route. It should be noted, however, that a crowded section included in the congestion information is deemed as uncrowded. Thus, in the case where the congestion degree has been varied from uncrowded to crowded and in the case where the section for indicating crowded has been varied, for example, it is determined that the congestion status of the expected travel route has not been varied. Thus, it is less likely to be determined that the congestion status of the expected travel route has been varied than in the case where the congestion determination criterion is (2).

Figure 14:
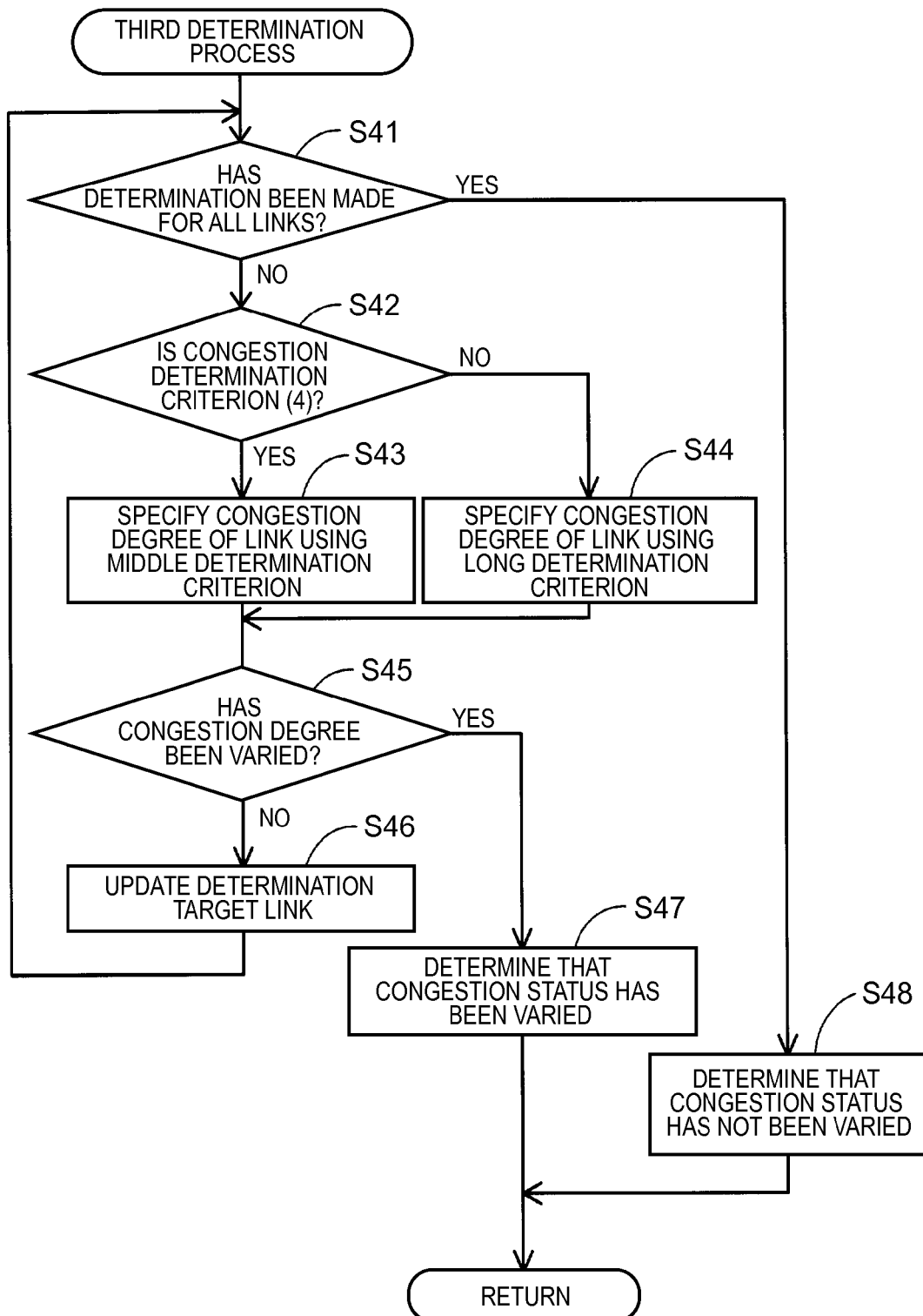
FIG. 14 is a flowchart of a sub process program of a third determination process according to the embodiment.

Next, a sub process of the third determination process executed in S15 will be described with reference to FIG. 14. FIG. 14 is a flowchart of a sub process program of the third determination process.

First, in S41, the CPU 51 determines whether or not determination processes in and after S42 have been performed for all the links that compose the expected travel route.

In the case where it is determined that the determination processes in and after S42 have been performed for all the links that compose the expected travel route (S41: YES), the process proceeds to S48. In the case where it is determined that the determination processes in and after S42 have not been performed for all the links that compose the expected travel route (S41: NO), the process proceeds to S42.

In S42, the CPU 51 determines whether or not the congestion determination criterion decided in S4 is the determination criterion (4).

In the case where it is determined that the congestion determination criterion decided in S4 is the determination criterion (4) (S42: YES), the process proceeds to S43. In the case where it is determined that the congestion determination criterion decided in S4 is the determination criterion (5) (S42: NO), in contrast, the process proceeds to S44.

In S43, the CPU 51 specifies the congestion degree of a determination target link, among the links that compose the expected travel route, using the middle determination criterion in the unit of link. When the middle determination criterion is used, as described above, the congestion degree of a link is determined to be congested if there is any congested section in at least a part of the link, the congestion degree of a link is determined to be crowded if there is no congested section in the link and there is any crowded section in at least a part of the link, and the congestion degree of the remaining links is determined to be uncrowded. In specifying the congestion degree in S43, a total of two patterns are specified on the basis of the last acquired congestion information and the congestion information acquired one cycle earlier, among the congestion information stored in the congestion information DB 47. After that, the process proceeds to S45.

In S44, on the other hand, the CPU 51 specifies the congestion degree of a determination target link, among the links that compose the expected travel route, using the long determination criterion in the unit of link. When the long determination criterion is used, the congestion degree of a link is determined to be congested if half or more portions of the link are determined to be congested sections, and the congestion degree of the remaining links is determined to be uncrowded. In specifying the congestion degree in S44, a total of two patterns are specified on the basis of the last acquired congestion information and the congestion information acquired one cycle earlier, among the congestion information stored in the congestion information DB 47. After that, the process proceeds to S45.

Next, in S45, the CPU 51 compares the congestion degree specified on the basis of the last acquired congestion information in S43 or S44 with the congestion degree specified on the basis of the congestion information acquired one cycle earlier for a determination target link, among the links that compose the expected travel route. The CPU 51 thus determines whether or not the congestion degree of the link has been varied.

In the case where it is determined that the congestion degree of the link has been varied (S45: YES), the process proceeds to S47. In the case where it is determined that the congestion degree of the link has not been varied (S45: NO), in contrast, the process proceeds to S46.

In S46, the CPU 51 updates the determination target link, among the links that compose the expected travel route, to the next link. After that, the process returns to S41, and the processes in and after S42 are performed for the link after the update.

In S47, the CPU 51 determines that the congestion status of the expected travel route has been varied. After that, the process proceeds to S6. As a result, the travel plan 48 is corrected in S7.

In S48, on the other hand, the CPU 51 determines that the congestion status of the expected travel route has not been varied. After that, the process proceeds to S6. As a result, the travel plan 48 is not corrected.

Figure 15:
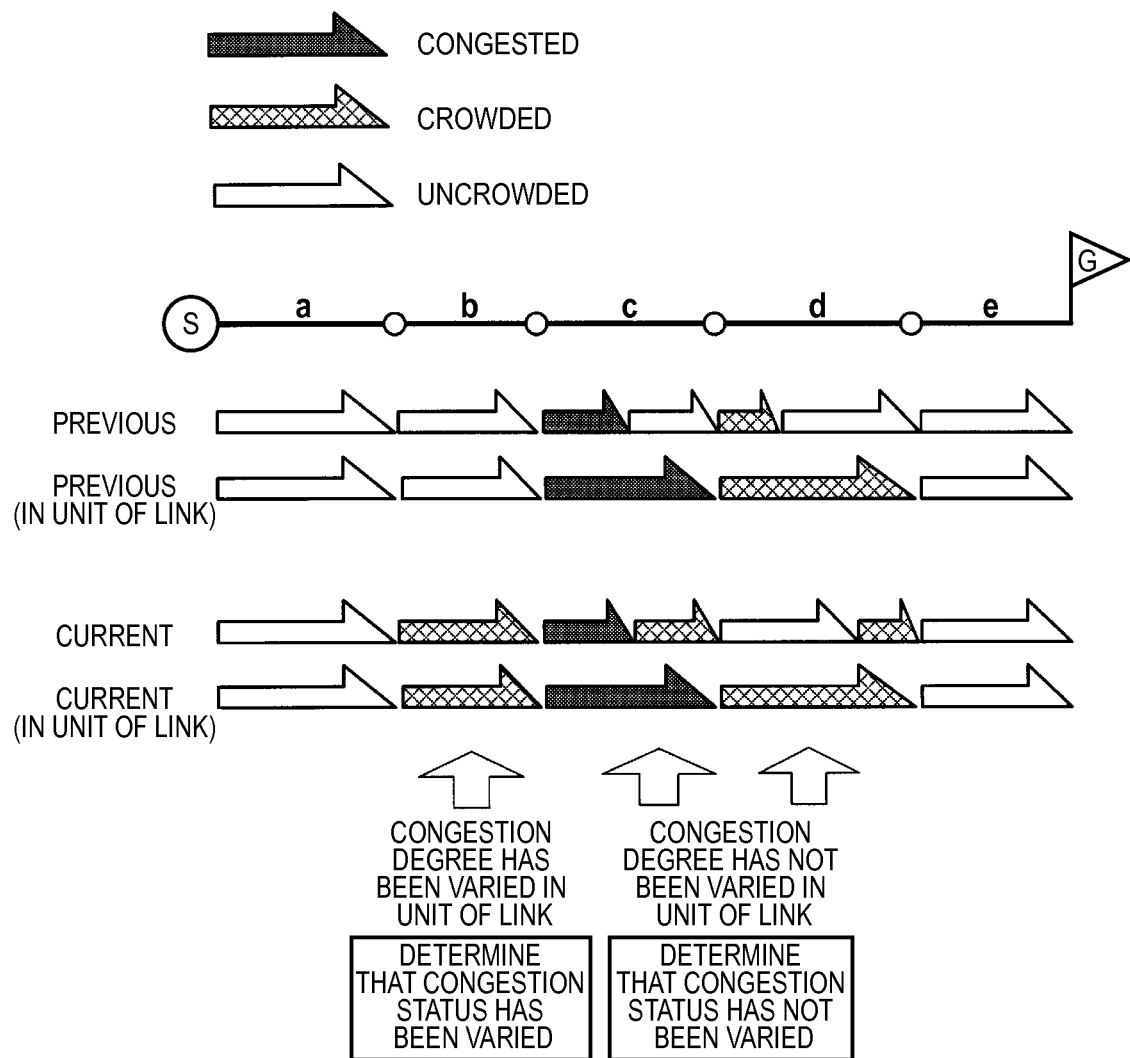
FIG. 15 illustrates a specific example in which it is determined in the third determination process whether or not the congestion status of an expected travel route has been varied.

In the third determination process (FIG. 14) executed in the case where the congestion determination criterion is (4), as illustrated in FIG. 15, it is determined that the congestion status of the expected travel route has been varied if there is any link, the congestion degree of which specified in the unit of link using the middle determination criterion has been varied, among the links that compose the expected travel route. If there is a congested section or a crowded section in a part of a link, the congestion degree of the link is determined to be congested or crowded (that is, the congestion degree of the link is susceptible to change and segmented). Thus, it is more likely to be determined that the congestion status of the expected travel route has been varied than in the case where the congestion determination criterion is (5).

On the other hand, in the third determination process (FIG. 14) executed in the case where the congestion determination criterion is (5), as illustrated in FIG. 16, it is determined that the congestion status of the expected travel route has been varied if there is any link, the congestion degree of which specified in the unit of link using the long determination criterion has been varied, among the links that compose the expected travel route. The congestion degree of a link is not determined to be congested unless half or more portions of the link are congested sections and a crowded portion is not taken into consideration (that is, the congestion degree of the link is insusceptible to change and simplified). Thus, it is less likely to be determined that the congestion status of the expected travel route has been varied than in the case where the congestion determination criterion is (4).

With the navigation apparatus 1, the travel assist method performed by the navigation apparatus 1, and the computer program executed by the navigation apparatus 1 according to the embodiment, as described in detail above, congestion information is acquired from the VICS center (S1), the current state of the vehicle is acquired (S3), it is determined whether or not the congestion status of the expected travel route for the vehicle has been varied from the congestion information using a criterion based on the state of the vehicle (S6), and in the case where it is determined that the congestion status of the expected travel route has been varied, the travel plan 48 is corrected using the congestion status after the variation (S7). Thus, it is possible to prevent frequent corrections of the travel plan 48 due to variations in congestion information. As a result, it is possible to reduce the process burden related to the correction of the travel plan 48 and the process burden related to communication for transmission of the corrected travel plan 48 within the vehicle. In addition, it is possible to correct the travel plan only in a situation in which it is necessary to correct the travel plan 48 on the basis of the status of the vehicle, and to prevent an unnecessary process from being performed.

The congestion degree for each link is calculated using different criteria depending on whether the state of the vehicle is in the long operation mode or the middle operation mode, and a comparison is made between the calculated congestion degrees for each link to determine whether or not the congestion status of the travel route has been varied. Thus, it is possible to appropriately determine whether or not it is necessary to correct the travel plan on the basis of the operation mode of the vehicle and the congestion determination criterion in the operation mode.

In the case where the state of the vehicle is in the middle operation mode, it can be made easy to correct the travel plan on the basis of an update of the congestion information by determining the congestion determination criterion such that the congestion degree is susceptible to change and segmented. As a result, it is possible to prevent occurrence of a situation in which the fuel consumption amount is increased, travel is ended with a large remaining battery capacity, or the like and to result in efficient travel by optimizing the travel plan at all times in a situation of the vehicle in which there is no extra remaining battery capacity.

In the case where the state of the vehicle is in the long operation mode, it can be made difficult to correct the travel plan on the basis of an update of the congestion information by determining the congestion determination criterion such that the congestion degree is insusceptible to change and simplified. As a result, it is possible to reduce the process burden related to the correction of the travel plan and the process burden related to communication for transmission of the corrected travel plan within the vehicle by correcting the travel plan as infrequently as possible in a situation of the vehicle in which there is an extra remaining battery capacity.

As the load of communication within the vehicle is higher, the travel plan is less likely to be corrected on the basis of an update of the congestion information. Thus, it is possible to prevent other communication within the vehicle from being blocked by frequent communication related to the travel plan.

As the resource of the communication control ECU 14 of the vehicle is poorer, the travel plan is less likely to be corrected on the basis of an update of the congestion information. Thus, it is possible to prevent other communication within the vehicle from being blocked by frequent communication related to the travel plan.

It should be understood that the present subject matter is not limited to the embodiment described above, and that various improvements and modifications may be made.

For example, although the congestion information is acquired from the VICS center in the embodiment, the congestion information may be acquired from a center (e.g. a probe center) other than the VICS center.

In the embodiment, (A) the operation mode (the long operation mode or the middle operation mode) of the vehicle, (B) the load status of communication, and (C) the resource of the communication control ECU 14 are mentioned as the state of the vehicle which is used to decide the congestion determination criterion. However, other items may also be taken into consideration. For example, the congestion determination criterion may be decided with the resource of the navigation ECU 33 also taken into consideration.

In the embodiment, a travel plan for a hybrid vehicle that uses a motor and an engine as drive sources is prepared. However, the present subject matter may also be applied to a case where a travel plan for an engine vehicle that uses an engine as a drive source is prepared and a case where a travel plan for an EV vehicle that uses a motor as a drive source is prepared. A travel plan related to control of the engine is prepared as the travel plan for the engine vehicle. A travel plan related to control of the motor is prepared as the travel plan for the EV vehicle.

The travel assist process program (FIGS. 6, 8, 9, 11, and 14) according to the embodiment is executed by the navigation ECU 33 of the navigation apparatus. However, the travel assist process program may be executed by the vehicle control ECU 9. Alternatively, the process may be performed by a plurality of ECUs in a distributed manner.

The present subject matter may be applied to various devices that can control the vehicle via the vehicle control ECU 9 besides the navigation apparatus. For example, the present subject matter may also be applied to in-vehicle devices other than the navigation apparatus, and portable terminals, personal computers, and so forth (hereinafter referred to as portable terminal etc.) such as a cellular phone, a smartphone, and a PDA. The present subject matter may also be applied to a system composed of a server and a portable terminal etc. In this case, each step of the travel assist process program (FIGS. 6, 8, 9, 11, and 14) discussed above may be performed by any of the server and the portable terminal etc.

While a travel assist system according to a specific embodiment of the present subject matter has been described above, the travel assist system may be configured as described below, and the following effect can be achieved in such cases.

For example, a first configuration is as follows.

The vehicle state acquisition module acquires the operation mode of the vehicle as the state of the vehicle. The variation determination module calculates the congestion degree for each link using different criteria depending on the operation mode of the vehicle, and makes a comparison between the calculated congestion degrees for each link to determine whether or not the congestion status of the travel route has been varied.

With the travel assist system configured as described above, the congestion degree for each link is calculated using different criteria depending on the operation mode of the vehicle, and a comparison is made between the calculated congestion degrees for each link to determine whether or not the congestion status of the travel route has been varied. Thus, it is possible to appropriately determine whether or not it is necessary to correct the travel plan on the basis of the operation mode of the vehicle and the congestion determination criterion in the operation mode.

A second configuration is as follows.

The vehicle includes the drive motor and the engine as drive sources. The travel planning module prepares the travel plan in which the EV travel range, in which the vehicle travels using only the drive motor as a drive source, and the HV travel range, in which the vehicle travels using both the drive motor and the engine as drive sources, are set for the travel route. The state of the vehicle is in one of the long operation mode in which the travel plan is prepared for the travel route to control drive of the drive motor and the engine, and the middle operation mode in which the travel plan is prepared for a range within a predetermined distance ahead of the position of the vehicle in the travel direction on the basis of the road status ahead of the vehicle in the travel direction to control drive of the drive motor and the engine. The variation determination module calculates the congestion degree for each link using different criteria depending on whether the state of the vehicle is in the long operation mode or the middle operation mode, and makes a comparison between the calculated congestion degrees for each link to determine whether or not the congestion status of the travel route has been varied.

With the travel assist system configured as described above, the congestion degree for each link is calculated using different criteria depending on whether the state of the vehicle is in the long operation mode or the middle operation mode, and a comparison is made between the calculated congestion degrees for each link to determine whether or not the congestion status of the travel route has been varied. Thus, it is possible to appropriately determine whether or not it is necessary to correct the travel plan on the basis of the operation mode of the vehicle and the congestion determination criterion in the operation mode.

The phrase "using both the drive motor and the engine as drive source" does not require that both the engine and the drive motor should be driven at all times, and includes a state in which only one of the engine and the drive motor is driven in accordance with the situation. For example, switching may be performed in accordance with the travel status among travel in which only the engine is used as a drive source, travel in which only the drive motor is used as a drive source, and travel in which both the engine and the drive motor are used as drive sources.

A third configuration is as follows.

The congestion information is information that specifies a crowded section of the travel route and a congested section that is higher in congestion degree than the crowded section. In the case where the state of the vehicle is in the middle operation mode, the variation determination module determines that a link is congested if there is any congested section in at least a part of the link that composes the travel route, determines that a link is crowded if there is no congested section in the link and there is any crowded section in at least a part of the link, determines that the remaining links are uncrowded, and determines that the congestion status of the travel route has been varied in the case where the determination result of the congestion degree for each link has been varied among congested, crowded, and uncrowded.

With the travel assist system configured as described above, in the case where the state of the vehicle is in the middle operation mode, it can be made easy to correct the travel plan on the basis of an update of the congestion information by determining the congestion determination criterion such that the congestion degree is susceptible to change and segmented. As a result, it is possible to prevent occurrence of a situation in which the fuel consumption amount is increased, travel is ended with a large remaining battery capacity, or the like and to result in efficient travel by optimizing the travel plan at all times in a situation of the vehicle in which there is no extra remaining battery capacity.

A fourth configuration is as follows.

The congestion information is information that specifies a crowded section of the travel route and a congested section that is higher in congestion degree than the crowded section. In the case where the state of the vehicle is in the long operation mode, the variation determination module determines that a link is congested if half or more portions of the link that composes the travel route are congested sections, determines that the remaining links are uncrowded, and determines that the congestion status of the travel route has been varied in the case where the determination result of the congestion degree for each link has been varied between congested and uncrowded.

With the travel assist system configured as described above, in the case where the state of the vehicle is in the long operation mode, it can be made difficult to correct the travel plan on the basis of an update of the congestion information by determining the congestion determination criterion such that the congestion degree is insusceptible to change and simplified. As a result, it is possible to reduce the process burden related to the correction of the travel plan and the process burden related to communication for transmission of the corrected travel plan within the vehicle by correcting the travel plan as infrequently as possible in a situation of the vehicle in which there is an extra remaining battery capacity.

A fifth configuration is as follows.

The state of the vehicle is the communication load on communication within the vehicle. The criterion of the variation determination module is determined such that it is less likely to be determined that the congestion status of the travel route has been varied as the communication load on communication within the vehicle is higher.

With the travel assist system configured as described above, as the load of communication within the vehicle is higher, the travel plan is less likely to be corrected on the basis of an update of the congestion information. Thus, it is possible to prevent other communication within the vehicle from being blocked by frequent communication related to the travel plan.

A sixth configuration is as follows.

The state of the vehicle is the resource of a communication ECU that controls communication within the vehicle. The criterion of the variation determination module is determined such that it is less likely to be determined that the congestion status of the travel route has been varied as the resource of the communication ECU becomes poorer.

With the travel assist system configured as described above, as the resource of the communication ECU of the vehicle is poorer, the travel plan is less likely to be corrected on the basis of an update of the congestion information. Thus, it is possible to prevent other communication within the vehicle from being blocked by frequent communication related to the travel plan.

DESCRIPTION OF THE REFERENCE NUMERALS

1 NAVIGATION APPARATUS
2 VEHICLE
3 VEHICLE CONTROL SYSTEM
4 ENGINE
5 DRIVE MOTOR
7 BATTERY
33 NAVIGATION ECU
51 CPU
52 RAM
53 ROM

The invention claimed is:
1. A travel assist system comprising:
   travel planning module for preparing, in the case where a vehicle travels along a travel route, a travel plan related to control of a drive source of the vehicle for the travel route;

congestion information acquisition module for acquiring congestion information on the travel route;

vehicle state acquisition module for acquiring a state of the vehicle;

variation determination module for determining whether or not a congestion status of the travel route has been varied from the congestion information using a criterion based on the state of the vehicle; and travel plan correction module for correcting the travel plan, in the case where it is determined that the congestion status of the travel route has been varied, using the congestion status after the variation, wherein the vehicle state acquisition module acquires an operation mode of the vehicle as the state of the vehicle; and the variation determination module:
calculates a congestion degree for each link using different criteria depending on the operation mode of the vehicle, and
makes a comparison between the calculated congestion degrees for each link to determine whether or not the congestion status of the travel route has been varied.

2. The travel assist system according to claim 1, wherein the vehicle includes a drive motor and an engine as drive sources;

the travel planning module prepares the travel plan in which an EV travel range, in which the vehicle travels using only the drive motor as a drive source, and an HV travel range, in which the vehicle travels using both the drive motor and the engine as drive sources, are set for the travel route;

the state of the vehicle is in one of
a long operation mode in which the travel plan is prepared for the travel route to control drive of the drive motor and the engine, and
a middle operation mode in which the travel plan is prepared for a range within a predetermined distance ahead of a position of the vehicle in a travel direction on the basis of a road status ahead of the vehicle in the travel direction to control drive of the drive motor and the engine; and the variation determination module
calculates a congestion degree for each link using different criteria depending on whether the state of the vehicle is in the long operation mode or the middle operation mode, and
makes a comparison between the calculated congestion degrees for each link to determine whether or not the congestion status of the travel route has been varied.

3. The travel assist system according to claim 2, wherein the congestion information is information that specifies a crowded section of the travel route and a congested section that is higher in congestion degree than the crowded section; and in the case where the state of the vehicle is in the middle operation mode,
the variation determination module
determines that a link is congested if there is any congested section in at least a part of the link that composes the travel route,
determines that a link is crowded if there is no congested section in the link and there is any crowded section in at least a part of the link,
determines that the remaining links are uncrowded, and
determines that the congestion status of the travel route has been varied in the case where a determination result of the congestion degree for each link has been varied among congested, crowded, and uncrowded.

4. The travel assist system according to claim 2, wherein the congestion information is information that specifies a crowded section of the travel route and a congested section that is higher in congestion degree than the crowded section; and in the case where the state of the vehicle is in the long operation mode,
the variation determination module
determines that a link is congested if half or more portions of the link that composes the travel route are congested sections,
determines that the remaining links are uncrowded, and
determines that the congestion status of the travel route has been varied in the case where a determination result of the congestion degree for each link has been varied between congested and uncrowded.

5. The travel assist system according to claim 1, wherein the state of the vehicle is a communication load on communication within the vehicle; and the criterion of the variation determination module is determined such that it is less likely to be determined that the congestion status of the travel route has been varied as the communication load on communication within the vehicle is higher.

6. The travel assist system according to claim 1, wherein the state of the vehicle is a resource of a communication ECU that controls communication within the vehicle; and the criterion of the variation determination module is determined such that it is less likely to be determined that the congestion status of the travel route has been varied as the resource of the communication ECU is poorer.

7. A computer readable non-transitory medium comprising a computer program for causing a computer to implement:

a travel planning function of preparing, in the case where a vehicle travels along a travel route, a travel plan related to control of a drive source of the vehicle for the travel route;

a congestion information acquisition function of acquiring congestion information on the travel route;

a vehicle state acquisition function of acquiring a state of the vehicle;

a variation determination function of determining whether or not a congestion status of the travel route has been varied from the congestion information using a criterion based on the state of the vehicle; and a travel plan correction function of correcting the travel plan, in the case where it is determined that the congestion status of the travel route has been varied, using the congestion status after the variation, wherein the vehicle state acquisition function acquires an operation mode of the vehicle as the state of the vehicle; and the variation determination function:
calculates a congestion degree for each link using different criteria depending on the operation mode of the vehicle, and
makes a comparison between the calculated congestion degrees for each link to determine whether or not the congestion status of the travel route has been varied.

* * * * *